Feb. 12, 1946. G. N. HEIN 2,394,687
SYRINGE WITH ADJUSTABLE PISTON CONSTRUCTION
Filed June 21, 1941 2 Sheets-Sheet 1

INVENTOR.
GEORGE N. HEIN
BY
ATTORNEY.

Feb. 12, 1946. G. N. HEIN 2,394,687
SYRINGE WITH ADJUSTABLE PISTON CONSTRUCTION
Filed June 21, 1941 2 Sheets-Sheet 2
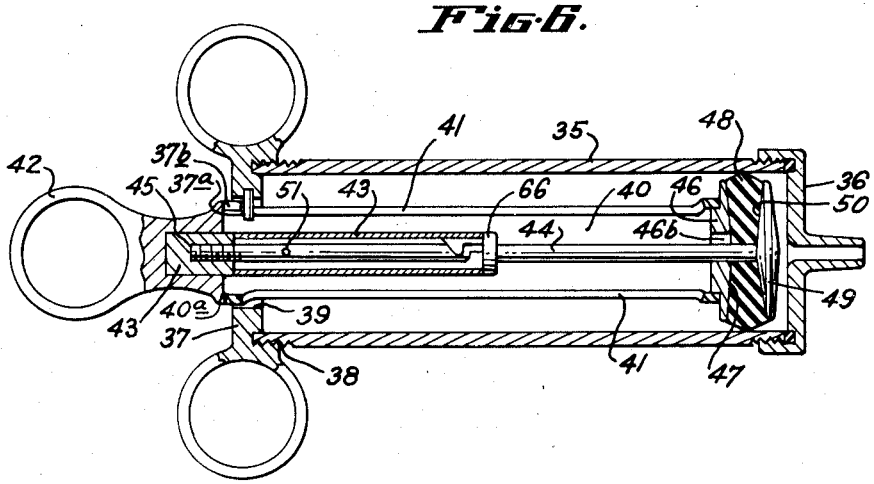
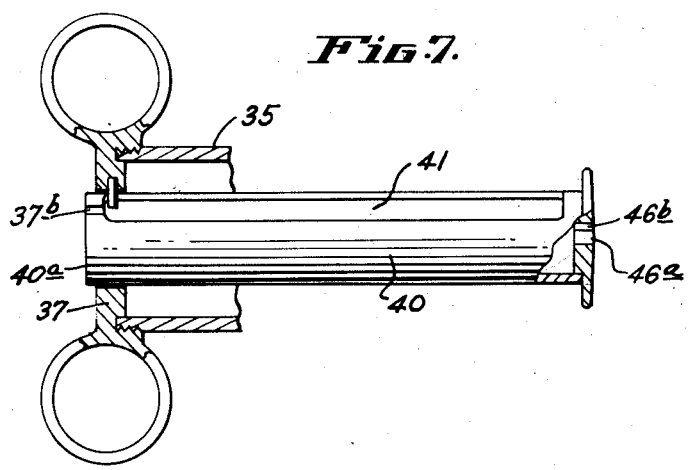
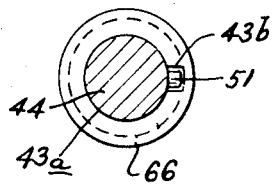
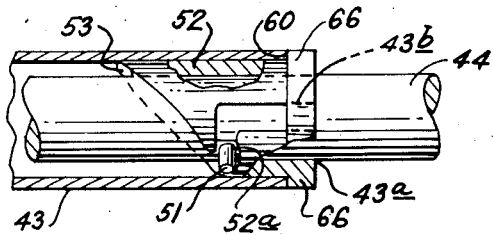
INVENTOR.
GEORGE N. HEIN
BY
ATTORNEY.

Patented Feb. 12, 1946

2,394,687

UNITED STATES PATENT OFFICE 2,394,687

SYRINGE WITH ADJUSTABLE PISTON CONSTRUCTION

George N. Hein, San Carlos, Calif.

Application June 21, 1941, Serial No. 399,094

5 Claims. (Cl. 128—215)

This invention relates to improved piston construction for syringes and the like, and more particularly to a piston having a packing gland or gasket which is adjustable by remote control.

The conventional pistons now in use are constructed along lines which make the gasket thereof impossible of adjustment, or if adjustable, are quite inaccessible and difficult to inspect, cleanse, or sterilize, depending upon the art in which the devices are used.

Among the objects of the invention are to provide a piston simple in construction in which a gasket or packing means may be adjusted remotely therefrom and at any position during the excursion of the piston in a cylinder or barrel; another object is to provide a piston assembly which may be readily removed from the cylinder or barrel while still maintaining its adjustment with relation to the cylinder; another object is to provide a piston in which the parts may be dis-assembled from their operating relationship and yet remain loosely connected or linked relative to each other to avoid complications of re-assembly into their previously adjusted operative relationship. A further object is to provide a piston which may be quickly and easily adjusted to fit cylinders of varying diameters, and to provide in connection therewith a readily adjustable packing gasket having great sealing qualities with relation to the cylinder with a minimum of frictional resistance.

With the foregoing and other objects in view, all of which will be more apparent as this description proceeds, the invention is exemplified in a practical and efficient form in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawings wherein:

Fig. 6 is a longitudinal transverse section of another modified form of the invention.

Fig. 7 is a fragmentary longitudinal view partly broken away, of a portion of the device shown in Fig. 6, to show detail.

Fig. 8 is a fragmentary longitudinal view of a portion of apparatus shown in Fig. 6, enlarged to show detail.

Fig. 9 is an end view of a guide member shown in Fig. 8 and showing a piston rod member partly in section.

Figure 1:
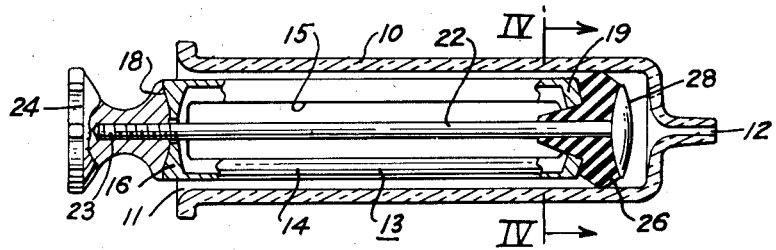
Fig. 1 is a longitudinal view of one form which the invention may take, partly broken away and partly in transverse section.

Referring to Fig. 1, there is provided a cylinder or syringe barrel 10 open at one end 11 to receive a piston and having an opening 12 of reduced diameter at its opposite end for discharge of fluid within the barrel responsive to pressure, or the filling of the barrel upon the suction stroke of the piston.

Figure 3:
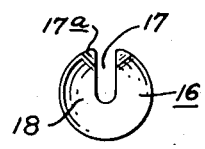
Fig. 3 is a top view of a sleeve member shown in Figs. 1, 2 and 5.
Figure 4:
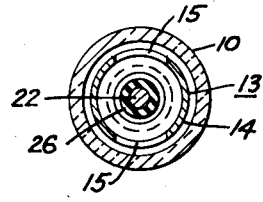
Fig. 4 is a lateral transverse section on line IV—IV of Fig. 1.

A piston member generally indicated 13 is provided, and preferably comprises an elongated sleeve member 14 which is hollow or tubular to permit a piston rod 22 to pass therethrough; more particularly it is preferred that the tubular sleeve member 14 be generally cylindrical in transverse section having its side walls fenestrated as at 15. The elongated sleeve 14 is capped at its upper end by the cap 16, the latter having a slotted opening 17 at its edge and extending inwardly to include the axis of the sleeve as best shown in Fig. 3. The radially outer opening of the slot 17 communicates with one of the fenestrations 15 in the side of the elongated sleeve member. The slotted cap member 16 is concave centrally as at 18 and provides a seat for rotatively seating of a thumbnut hereafter described.

The opposite or bottom end of the elongated sleeve is likewise closed by a suitable member such as a plate 19 which has a beveled gasket-contacting face 19a and is provided with a centrally disposed opening 20 having upwardly and inwardly tapered walls 21 for receiving and accurately centering an extended portion of a gasket relative to the piston and also providing a holding means to prevent the movement of the gasket away from co-axial alignment with the rod 22 which might cause its sealing wall to vault past the retaining face of the plates 19 and 28 when under pressure or suction. A piston rod 22 is mounted longitudinally within the sleeve 14, one end of which is releasably engaged in the slot 17 of the cap member 16 and the opposite end of which passes through the opening 20 of plate 19.

Means are provided for reciprocating the piston assembly in the syringe cylinder, and for adjusting a packing gasket member at the opposite end thereof. Without limiting such means to the specific exemplification herein, there may be conveniently provided on piston rod 22 a threaded end 23 threadedly engaged by a member for hand pressure broadly referred to herein generically as a thumb nut or pressure member 24, meaning thereby, any shape or form of member for manipulation to reciprocate the piston 13 or adjust a packing gasket 26. As shown in Fig. 1, the thumbnut has a convex base 25 which rotatably seats into concavity 18 of the cap 16 so as to center the piston rod 22 and also to establish it in a fixed, though releasable, position relative to the sleeve 14 when the thumb nut is tightened on threads 23.

Figure 2:
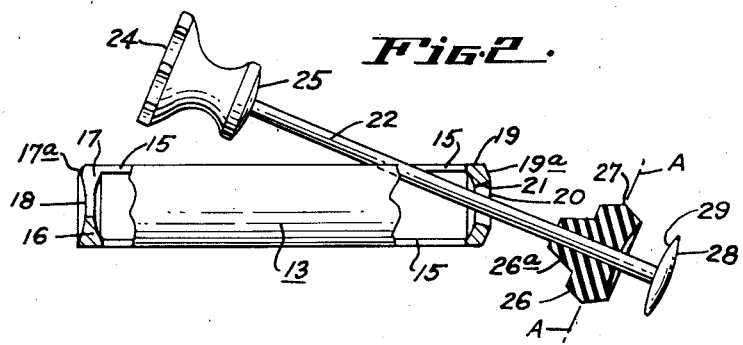
Fig. 2 is a longitudinal side view of portions of structure shown in Fig. 1, the parts thereof being in operatively disassembled positions, and the view being partly in section and partly broken away.

The opposite or lower end of the rod 22 is provided with a fixedly attached disc plate 28 beveled on its inner face 29. The bevels of plates 19 and 28 converge relatively toward their centers as illustrated in Fig. 1. The opposed faces of the plates are of very substantial diameter so as to back-up or reinforce the planar faces of the gasket adjacent the sealing edge. Between the beveled faces of plates 19 and 28 there is mounted gasket member 26 which is of compressible material such as rubber, leather, combinations of rubber and fabric or the like, the quality of resilience of rubber being preferred for both compressibility, and radial expansion and contraction. The upper portion of the gasket, as shown in Figs. 1 and 2 comprises a conical frustrum 26a which fits into the circular converging walls 21 of the opening 20 in the sleeve, thereby centering both the gasket and the rod 22 upon which it is mounted. The side or sealing wall of the gasket is tapered from the upper and lower planar faces of the gasket to a substantially median plane indicated by line A laterally transversely of the gasket body providing a circumferential apex 27 in the gasket sealing wall. The beveling of the oppositely disposed faces 19a and 29 of the respective sleeve and disc plates 19 and 28 provides faces or converging walls between which the body 26 of the gasket is disposed when the apparatus is in operating position as shown in Fig. 1. The purpose of having such converging walls is so that upon manipulation of the thumb nut member 24 rotatively on the concavity 18 of the seat, and relative to the threaded portion 23, the gasket will be clampingly compressed between the bevels of plates 19, 28 and thus expanded radially due to its compressibility so that the circumferential apex 27 will contact the inner wall of the cylinder barrel in any degree desirable or necessary to effectuate the degree of sealing desired by the operator. Though it is much preferred that the plate faces 19a and 29 be beveled, it has been found sufficient for fairly efficient operation if the bevel is omitted, or if the bevel is included in one only of the faces 19a, 29, in which latter event it is preferred that the face 29 of the plate 28 should be the selectively beveled plate.

The piston assembly 13 may be withdrawn at any time from the cylinder as a unit as shown in Fig. 2 in which event the unit may be brokendown for purposes of cleaning or sterilization by merely tilting the thumbnut member 24 from the concave seat 18 since the outer edges of the slot 17 are beveled as at 17a, whereupon the piston rod 22 may slide radially outwardly through the opening of slot 17 and into the communicating fenestration 15, and thus be disassembled from an operating position and yet remain linked together loosely and without relative stabilization, because the rod 22 is held in the opening 20 since thumbnut 24 and gasket 26 are wider in diameter than opening 20. This releases the members 14, 22, 26 and 28, loosely and without fixed relative stabilization for sterilization and without disturbing their previous relative adjustment when reassembled.

After the device has been cleaned or sterilized it may be quickly and accurately reassembled into operating position by drawing the conical portion 26a of the gasket into the tapered opening 20 and snapping the convex surface 25 of the thumbnut 24 over the beveled edge 17a of the cap 16, the rod 22 passing into the slot 17 in so doing, the compressibility of the gasket member 26 with relation to the faces 19a and 29 being sufficient to permit such snap-over movement.

An especially advantageous result is accomplished by the structure herein above described and its demountability and its remountability while its parts remain linked, in that when the piston rod is dismounted it has an extendability independently of the means which normally holds the piston rod 22 relative to the tubular member 14. This is highly desirable so that the piston rod, the gasket thereon and the tubular member remain loosely linked together for sterilization and quick reassembly. In other words, in Fig. 2 the means that normally holds the piston rod 22 relative to the tubular member 14 in syringeforming relation is the thumbnut 24 and the concave seat 18. This holding means may be totally dismounted or relatively disconnected as shown in Fig. 2 and yet the sleeve, rod and gasket remain linked together and the rod has an extendability independently of the holding means. Stated in terms of operation, the resilience of the gasket 26, or a single turn of the thumbnut on the threads 16 will permit the dislodgement of the thumbnut from the seat, yet the rod 22 has an additional extendability totally independently of these means which normally hold the tubular member 14 in operative piston-forming relation, while the parts remain linked together for quick and accurate reassembly.

Figure 5:
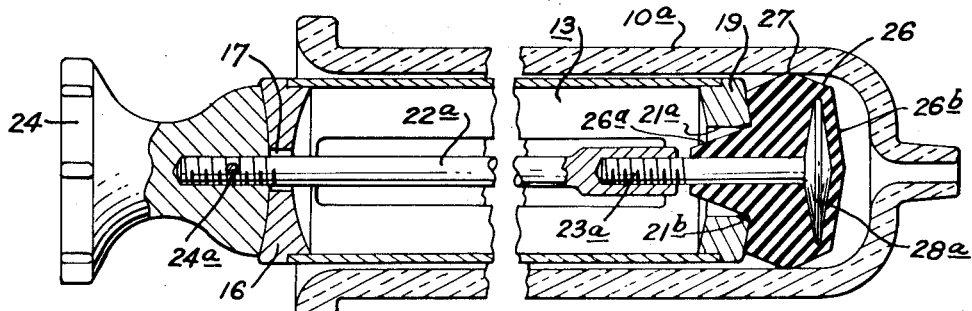
Fig. 5 is a longitudinal transverse section of a modified form of a device of the invention.

In the modification of Fig. 5 the piston rod 22a is divided into two sections one of which is fixedly mounted as by threads and pin 24a in the thumbnut 24 and is rotatable thereby, said section being of relatively shorter length than in the device of Fig. 1. At the opposite end, the said section of the piston rod 22a has a threaded connection 23a to a separate section of the piston rod whereby a lower plate member 28a is drawn into or released from a compressing relation upon the longitudinally central body portion of gasket 26 to selectively radially expand or radially contract the circumferential apex or sealing edge 27 by substantially similar operation as explained in relation to the device in Fig. 1. However, in the modification of Fig. 5, the plate 28a is embedded in the body of the lower portion of the gasket 26 and thereby provides a cushioned buffer portion 26b between the plate 28a and the syringe body 10a, which is desirable in some instances wherein the syringe bodies are made of glass.

The inner wall 21ª of the central opening 20 of lower closure plate 19 of the piston assembly 13 is tapered at the lower portion for a part only of its length, as indicated at 21ᵇ. It has been found that by forming the gasket member around the piston rod and the plate 28ª by molding the gasket thereon, the gasket is permanently centered relative to the piston rod, and therefore it requires only a very short tapered engagement of the conical wall of the gasket frustrum 26ª and the beveled wall portion 21ᵇ to accurately axially align the gasket 26 with the piston assembly 13. This construction makes possible easier adjustment of the gasket and is preferably used in larger devices. The cap 16 of the piston assembly in Fig. 5 is concave and radially slotted similar to cap 16 in Figs. 1, 2 and 3, the slot 17 likewise connecting with a fenestration 15 of the sleeve 14, which permits demountability of the piston rod in the same manner as shown in Fig. 2.

In Fig. 6 another modification of the invention is disclosed for that type of syringe which is usually of relatively larger diameter, comprising a barrel cylinder 35 machined at its lower end to securely or threadedly mount a discharge nipple 36. At the opposite end is a finger gripping yoke 37 threadedly mounted to the cylinder as at 38. The yoke 37 has a pin 37ª which, during assembly, is guided through an entering slot 37ᵇ, one face of the slot being shown in Fig. 6 in the piston sleeve 40 at the upper end of the fenestration 41. This pin 37ª prevents the piston from revolving when axial rotation is imparted to adjusting finger engaging thumbnut member 42.

The yoke 37 has an opening 39 centrally thereof through which there may be received the piston sleeve 40 which is provided with longitudinal fenestrations 41 within one of which the pin 37ª may slide. The piston sleeve 40 rotatively mounts at its upper end at seat 40ª a thumbnut 42 which has fixedly mounted therein for rotation therewith a tubular guide member 43 which has an axial opening 43ª at its lower end, including a radial communicating slot 43ᵇ.

To the lower end of the sleeve 40 there is affixed a closure disc plate member 46 providing at its outer face a plate having a beveled contacting face wall 47, to contact a gasket 48, the disc plate 46 having an axial opening 46ª centrally thereof, said axial opening having a radially outward communicating slot 46ᵇ. A piston rod 44 is slidingly engaged through the openings 43ª and 46ª which are co-axial, so that in assembly or disassembly, the piston rod 44 and pin 51 may be passed through the two openings 43ª, 46ª, whereupon the upper threaded end of rod 44 may be releasably threadedly engaged as at 45 by the fixedly held end of guide member 43 in the thumbnut. The piston rod 44 has a plate 49 at its extreme end having a bevel to its gasket-contacting face 50, the gasket member 48 being disposed between said two beveled faces 47 and 50 the bevels of which relatively converge toward the center thereof.

The radially outward circumferential sealing wall of the gasket 48 may be beveled outwardly from both of the planar gasket faces which contact said beveled plates, so as to provide a circumferential sealing edge or apex to the sealing wall on a median transverse plane A as similarly shown in Fig. 2. The plate 49 of the piston rod 44 is drawn into, or released from compression of gasket 48 by rotative manipulation of the thumb nut 42 which, due to the relatively fixed connection, thereby rotates guide member 43 upon threads 45. The thumbnut 42 seats rotatively on collar of piston member 40 as shown at 40ª.

The piston assembly is releasable so as to clean or sterilize its parts, by disengaging the threads 45 from guide member 43, whereupon the associated parts may be disassembled from operative relationship but remain loosely connected or linked as further described hereafter. To more clearly exemplify the releasing mechanism of rod 44 with relation to guide member 43, it will be noted that rod 44 has a peg or pin 51 intermediate its ends. Also, there is provided at the free end of guide 43, a tubular insert plug 66 which is fixedly secured within the tubular end of guide member 43, the inner diameter of plug 66 being that of the piston rod 44 for which it affords a longitudinal slide bearing, while the outer diameter fits snugly into the tubular guide sleeve 43. The base of the plug 66 provides the openings 43ª and slot 43ᵇ, and its lower circumferential portion provides a shoulder 60 affording a seat in contact with the lower end of the wall of the tubular guide member 43.

At its upper end the plug 66 is cut on an angle of a helix providing an end edge 53, thus leaving a space between the inner wall of guide member 43 and the outer circumference of piston rod 44, which gives room for peg 51 to rotate and slide freely within the guide 43. At the lower portion of the helical edge 53 of insert plug 66 it is irregularly slotted transversely and then axially as at 52 affording a bayonet slot having a depression 52ª or a temporary stop for pin 51, thus loosely linking the tubular member 40, rod 44, gasket 48 and plates 46, 49 when the parts are extended for cleaning or sterilizing. It will be observed that this embodiment in Figs. 6 to 9 is the same as has been heretofore described with relation to Fig. 2, in that the holding means of the piston rod assembly relative to the tubular sleeve member 40, is the seat 40ª and the thumbnut 42, yet when the thumbnut is completely unseated and disconnected, an extension of rod 44 may be effected, and yet the tubular member 40, guide member 43, gasket 48 and plates 46 and 49 remain loosely linked independent of the thumbnut 42 and seat 40ª whereby the rod has an independent extendability. However, to completely remove the piston rod 44, it may be rotated so the pin 51 may pass through the mouth of the bayonet slot 52 whereupon the piston rod 44 can be completely removed by pin 51 passing out through opening 43ᵇ.

To assemble the syringe shown in Fig. 6, the operator would first pass the fenestrated piston sleeve 41 through the finger ring yoke 37 by entering the pin 37ª into slot 37ᵇ, (see Fig. 7), to allow pin 37ª to slip into the fenestration 41; then the piston rod 44, having gasket 48 mounted thereon would be inserted through the openings 46ª and 43ª and threadedly connected to the thumb nut 42, finally screwing the yoke 37 on the syringe barrel. To disassemble the syringe for cleaning and sterilizing, the operator would first pull the piston assembly 40, 43, 44 out about half way, unscrew the yoke 37 and complete the removal of piston assembly, allowing the yoke to hang on the piston sleeve 40. Then, by loosening the thumb nut 42 from threads 45 and thus disconnecting the parts of the piston assembly from their operating relationship, he would have all parts remain loosely in one linked assembly that would be sterilizable. In this connection it will be noted that upon disconnecting the piston rod 44 from its threaded engagement 45 with thumbnut 42, the rod 44 would be free to move in opening 43ᵃ of the closure plug 66 and would normally drop until the pin 51 contacted the helical edge or ledge 53 which would guide the pin 51 into the offset 52ᵃ of bayonet slot 52 where it would normally be held against inadvertent removal. This action would also drop the plate 50 away from engagement with gasket 48 so the gasket would freely ride upon the lower extended part of rod 44 and out of contact with plate 46. In this loosely linked, but relatively unstabilized relation, the parts would be sufficiently separated for complete sterilization, yet connected in a loosely linked relation for ease in readily reassembling in operative relationship as a syringe.

Having thus described my invention, I claim:

1. In a syringe, a piston construction comprising a tubular sleeve for sliding axially relative to a syringe barrel wall, said sleeve having a side wall opening and having at one end a plate which has a central opening therethrough and having at its opposite end a radially slotted seat for a thumbnut, the slot of said seat being in relative communication with the opening in the side wall of the sleeve, a thumbnut rotatively mounted on said seat, a piston rod in the sleeve extending through said sleeve plate opening, said piston rod having one end adapted for engagement within the slot of the seat and for connection to the thumbnut and having at its opposite end another plate beyond the said sleeve plate opening, an axially compressible and radially expansible gasket mounted on said piston rod between said plates and adapted for sealing against the syringe barrel wall, the said thumbnut and piston rod being threadedly connected whereby the said plates may be adjusted relative to the gasket for selectively radially expanding and contracting the gasket, and said piston rod being selectively movable within said radial slot of the seat and the side wall opening of the sleeve whereby the thumbnut may be unseated while remaining connected to the piston rod and the rod may be loosely extended to release the gasket from its clamped relationship between the plates.

2. In a syringe, a piston construction comprising a tubular sleeve for sliding axially within a syringe barrel wall, said sleeve having a side wall opening and having at one end a plate which has a central opening therethrough and having at its opposite end a radially slotted concave seat for a thumbnut, the slot of said seat being in relative communication with the opening in the side wall of the sleeve, a thumbnut having a convex base face for rotatively mounting on said seat, a piston rod in the sleeve extending through and slidable in said sleeve plate opening, said piston rod having one end adapted for engagement within the slot of the seat and for connection to the thumbnut and having at its opposite end another plate beyond the said sleeve plate opening, an axially compressible and radially expansible gasket mounted on said piston rod between said plates and adapted for sealing against the syringe barrel wall, the said thumbnut and piston rod being threadedly connected whereby the said plates may be adjusted relative to the gasket for selectively radially expanding and contracting the gasket, the said piston rod being selectively movable within said radial slot of the seat and said side wall opening of the sleeve whereby the thumbnut may be unseated while remaining connected to the piston rod and the rod may be loosely held in the side wall opening of the sleeve to release the gasket from its clamped relationship between the plates, and the said sleeve, piston rod, thumbnut and gasket being loosely and connectedly linked together in a relatively unstabilized inoperative relation when said thumbnut is unseated from its piston-forming relation with the sleeve.

3. In a syringe, a piston construction comprising a tubular member for sliding axially relative to a cylinder barrel wall, and having at one end a gasket receiving plate which has a central opening therethrough, said tubular member having at its opposite end a seat for a thumbnut, a thumbnut rotatively mounted on said seat, a piston rod in the tubular member extending through said central plate opening and slidable therein, said piston rod having one end adapted for connection to the thumbnut and having a gasket engaging plate at its opposite end beyond said central opening of the other plate, an axially compressible and radially expandable and contractible gasket mounted on said piston rod between said plates and adapted for sealing against the cylindrical barrel wall, said gasket having a body portion provided with planar faces for abutting said plates and having intermediate its said faces a relatively narrow circumferential apex sealing edge of greater diameter than said planar faces, at least one of the opposed gasket-contacting faces of said plates having tapered relationship whereby the space between said opposed faces increases from their central portion toward their peripheral edge, the said thumbnut and the piston rod being threadedly connected whereby the said plates may be adjusted relative to the gasket for selectively expanding and contracting the gasket radially, and means for holding the tubular member, the piston rod and gasket in dismounted loosely linked relation whereby the piston rod may be extended to release the gasket from contact between said plates while maintaining the tubular member, rod and gasket in loosely linked relation, said last mentioned means being independent of the means which is operable for radially contracting and expanding the gasket.

4. In a syringe having a cylindrical barrel wall, a piston construction for sliding axially relative to the cylinder barrel wall, comprising a tubular member having at one end a gasket-receiving plate which has a central opening therethrough and having at its opposite end a seat for a thumbnut, a thumbnut rotatively mounted on said seat, a piston rod in the tubular member adjustably connected at one end to the thumbnut and having a shank extending through and slidable in said central plate opening and having another plate at its opposite end beyond the central opening of said first mentioned plate, a gasket mounted on said piston rod between said plates and adapted for sealing against the cylindrical barrel wall, said piston including means for radially expanding and contracting the gasket, and means for holding the tubular member, the piston rod and gasket in dismounted loosely linked relation, whereby the piston rod may be extended to release the gasket from contact between said plates while maintaining the tubular member, rod and gasket in loosely linked relation, said last mentioned means being independent of the means which is operable for radially expanding and contracting the gasket.

5. In a syringe, a piston construction comprising an elongated tubular member for sliding axially relative to a syringe barrel, and including a thumbnut for finger manipulation at one end, the opposite end of the tubular member including a plate having an opening centrally thereof adapted for receiving therethrough a piston rod for a sealing gasket, a piston rod for passing axially centrally through a gasket and having a transverse plate at its end, said rod being of substantially lesser diameter than the central opening of the plate of the tubular member, said plate members having relatively opposed faces at least one of which has its said opposing face beveled radially outwardly and away from the opposing face of the other plate member, an axially compressible gasket member mounted on said rod having its opposite planar faces engageable between the said respective plates of the tubular member and rod member, said gasket having a circumferential sealing edge tapered from its planar faces to an apex and being provided with a longitudinally axially extending body portion adapted for entering the central opening in the plate of the tubular member, said gasket-mounting piston rod and said thumbnut having threaded connection therebetween for relatively adjusting the plates axially whereby pressure of the plates on the gasket may be varied for selectively expanding and contracting the gasket radially, and means for holding the tubular member, the piston rod and gasket in dismounted loosely linked relation, whereby the piston rod may be extended to release the gasket from contact between said plates while maintaining the tubular member, rod and gasket in loosely linked relation, said last mentioned means being independent of the means which is operable for radially contracting and expanding the gasket.

GEORGE N. HEIN.